United States Patent [19]
King

[11] 3,988,640
[45] Oct. 26, 1976

[54] A.C. PROTECTIVE CIRCUIT
[75] Inventor: James R. King, Cedar Rapids, Iowa
[73] Assignee: Rockwell International Corporation, El Segundo, Calif.
[22] Filed: May 27, 1975
[21] Appl. No.: 581,188

[52] U.S. Cl. ............................. 317/9 R; 317/33 R; 325/362
[51] Int. Cl.² ............................................. H02H 3/20
[58] Field of Search ............ 317/16, 33 R, 31, 9 R; 307/237, 235 R; 329/134; 325/362, 347

[56] References Cited
UNITED STATES PATENTS

| | | | |
|---|---|---|---|
| 3,237,019 | 2/1966 | Fitzgerald | 307/237 |
| 3,310,688 | 3/1967 | Ditkofsky | 307/237 X |
| 3,350,573 | 10/1967 | Barany | 307/237 |
| 3,768,027 | 10/1973 | Matzek | 329/134 |

Primary Examiner—Gerald Goldberg
Attorney, Agent, or Firm—Howard R. Greenberg; Robert J. Crawford

[57] ABSTRACT

An electronic device is protected from excessive A. C. voltages by a diode in series with the A. C. signal path which is forward biased from a shunt D. C. power supply for passing desired A. C. signals without distortion and which is reverse biased by a series capacitor which is charged through a shunt threshold device whenever the A. C. voltage exceeds a predetermined level and is discharged through a shunt path thereafter.

7 Claims, 2 Drawing Figures

A.C. PROTECTIVE CIRCUIT

BACKGROUND OF THE INVENTION

The present invention pertains generally to A. C. protective circuits for protecting electronic devices from excessive A. C. voltages and specifically to such a circuit which may be advantageously utilized to protect the input circuitry of a radio receiver.

As is well known, R. F. signals of excessive intensity can damage the sensitive low level R. F. input circuitry of radio receivers unless proper protection is afforded. Receivers can be subjected to these excessive R. F. signals when operating in close proximity to a non-related transmitter whose transmission is inadvertently picked up by the radio receiver antenna or by a malfunction in the antenna switching device for controlling a receiver antenna that is commonly utilized for both transmitting and receiving. Although there have been a number of solutions developed to overcome this problem, these all exhibit one or more inherent disadvantages. For example, when clamping is employed to hold the input voltage to a desired level, significant amounts of power may have to be dissipated in the clamping device and when commonly used in combination with a series current limiting resistor attenuation in the desired signal results. A second approach which has been adopted and which is exemplified in U.S. Pat. No. 3,870,899 entitled "Receiver Protection Circuit Apparatus" entails monitoring the input voltage for the purpose of deactivating a series switch to prevent the application of high voltages to the sensitive circuitry which follows it. As may be perceived from this one example of this type of approach, this solution requires copious circuitry which materially adds to the complexity and cost of the radio receiver.

With the foregoing in mind, it is a primary object of the present invention to provide a new and improved A. C. protective circuit for protecting electronic devices from excessive A. C. voltages.

It is further object of the present invention to provide such an A. C. protective circuit which is simple in design and operation, yet provides effective protection.

It is still a further object of the present invention to provide such an A. C. protective circuit which is ideally suited for use with a radio receiver to protect it from excessively intense R. F. signals which might otherwise damage equipment therein.

These objects, as well as others, and the means by which they are achieved through the present invention may best be appreciated by referring to the Detailed Description of the Invention which follows hereinafter together with the accompanying figures.

BRIEF DESCRIPTION OF THE INVENTION

In conformance with the stated objects, the subject invention employs a diode connected in series with the A. C. signal path which is forward biased from a shunt D. C. power supply to enable the passage therethrough of desired A. C. signals without distortion. A capacitor connected in series with the signal path is charged from the A. C. signal with a polarity for reverse biasing the diode via a shunt threshold device whenever the magnitude of the A. C. signal exceeds a predetermined level established by the device. The capacitor is discharged through a shunt path whose time constant is preferably much greater than that for charging the capacitor so that its charge is diminished only slightly during each A. C. cycle for minimizing power dissipation and maintaining the diode essentially non-conductive during the presence of excessive A. C. voltages. The D. C. power supply and discharge path are provided with means for blocking the passage of A. C. current so as not to attenuate the desired A. C. signal.

To effectuate the stated object of simplicity, the preferred embodiments employ a diode as the threshold device and the D. C. power supply as part of the discharge path. In a second preferred embodiment, a constant current source operated at a low D. C. potential is employed in the D. C. power supply to minimize power dissipation, thus affording improved performance.

DETAILED DESCRIPTION OF THE INVENTION

Figure 1:
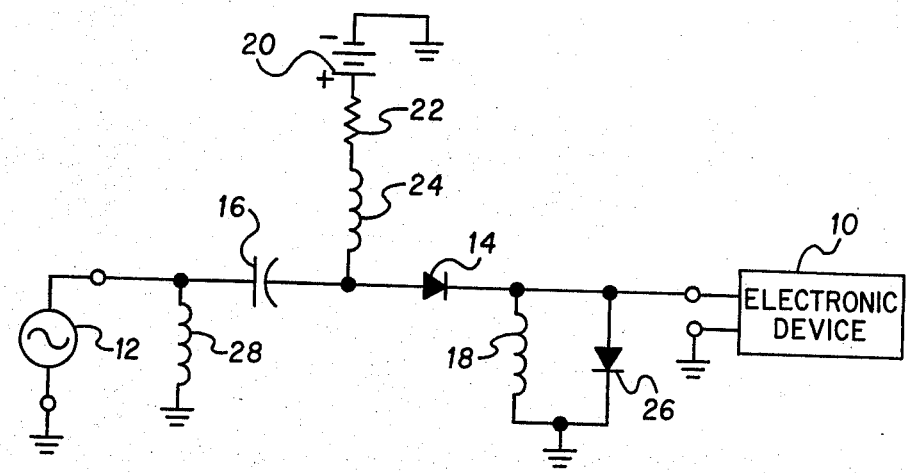
FIG. 1 is a schematic diagram of the preferred embodiment of the A. C. protective circuit of the invention.

As shown in FIG. 1, A. C. signals are applied to the terminals of an electronic device 10, such as a radio receiver, by an A. C. signal source 12 which in the case of a radio receiver is representative of the receiver antenna. Current return paths are shown grounded for convenience. Placed in series with the signal path interconnecting the electronic device 10 with the A. C. source 12 is a diode 14 and a capacitor 16 preferably having a low impedance at the A. C. operating frequency to minimize signal attenuation. Diode 14 is forward-biased for passing the desired A. C. signals without distortion by a shunt D. C. power supply which consists of a grounded inductor 18 connected to its cathode and a grounded D. C. voltage source 20 connected to its anode through the series combination of a resistor 22 and inductor 24. Resistor 22 limits the amount of current flowing through diode 14 for biasing it, while inductors 18 and 24 are designed to have a large impedance at the operating frequency of the A. C. source 12 so as not to attenuate the desired A. C. signal.

A grounded diode 26 connected to the cathode of diode 14 in shunt with the signal path is poled so that whenever its threshold level (approximately 0.7 volts) is exceeded, a low impedance path is provided for charging capacitor 16 from the A. C. signal produced by source 12 with a polarity to reverse bias diode 14 so as to render it nonconductive and thus protect electronic device 10 from any voltages in excess of the threshold level once sufficiently charged to 0.7 volts. Capacitor charging occurs whenever the voltage of the ungrounded terminal of A. C. source 12 is positive with respect to its grounded terminal and exceeds the threshold level (0.7 volts) of diode 26. Diode 26 provides the ancillary function of clamping the maximum voltage applied to the electronic device 10 to its threshold level even during the charging period for capacitor 16. By employing a suitable value for capacitor 16 in accordance with voltage division principles, it can be fully charged within one A. C. alternation for an A. C. signal of minimum amplitude thus optimizing the circuit performance.

A discharge current path for capacitor 16 is provided by a grounded inductor 28 connected to one of its terminals preferably in series with the portion of the D. C. power supply connected to the anode of diode 14 (to minimize required elements). By employing a suitable value for resistor 22, the discharge time period for capacitor 16 can be made to be greater than its charging time period, thus diminishing loss of charge in between charging A. C. alternations to reduce current flow and thereby minimize power dissipation during the presence of excessive A. C. voltages and the periods that diode 14 is conductive. It will be readily seen that the protection afforded is instantaneous and continuing through self-activation and restoration irrespective of whether or not the electronic device 10 has its power turned on.

Figure 2:
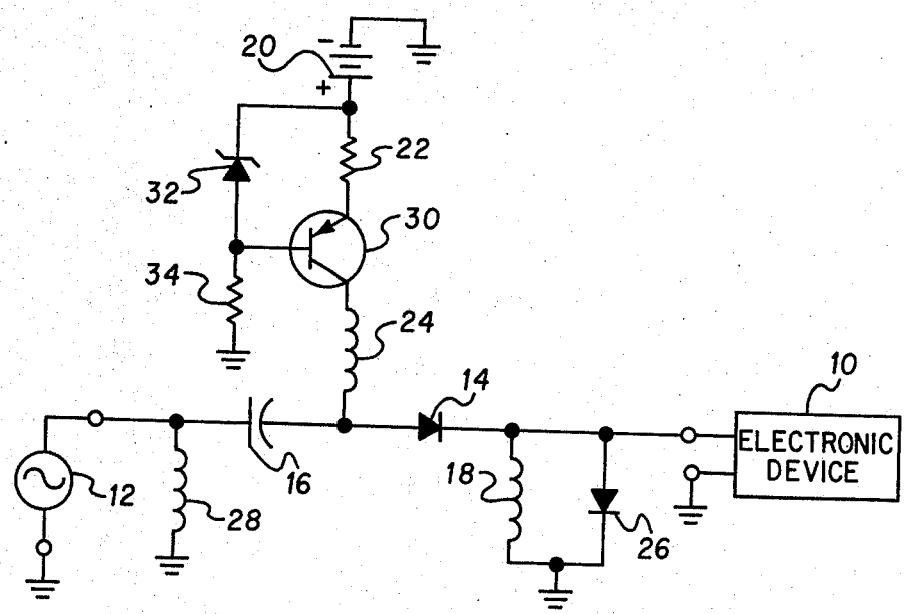
FIG. 2 depicts the A. C. protective circuit of FIG. 1 as modified to incorporate a constant current source in the D. C. power supply.

Although the A. C. protective circuit depicted in FIG. 1 effectuates its intended purpose of protecting electronic device 10 from excessive A. C. voltages, it does so without limiting the power dissipated in resistor 22 during the discharge period for capacitor 16. Power dissipation can be limited by using a current source for the D. C. power supply which can be accomplished by employing a large value for resistor 22 and a concomitant large D. C. voltage provided by voltage source 20 in order to provide the proper value of forward bias current to diode 14. A preferable alternative which obviates the need for the foregoing large values is shown in FIG. 2, wherein a transistor 30, zener diode 32 and resistor 34 have been added to the circuit to provide a constant current source which limits the power dissipated in resistor 22 during the capacitor discharge period. Irrespective of the voltage developed across capacitor 16, the current supplied by voltage source 20 remains constant at all times.

As the foregoing demonstrates, the simplicity of design and operation of the A. C. protective circuit of the invention affords electronic devices protection from excessive A. C. voltages at a cost which is commercially competitive with prior art circuits. In addition to these aforementioned advantages for the A. C. protective circuit, its instantaneous and continuing protection which is self-actuating and restoring irrespective of whether or not the protected electronic device has its power turned on, minimal power dissipation and negligible attenuation in the desired A. C. signals renders it eminently suitable for use with radio receivers.

Since various modifications to the foregoing embodiments of the invention may be made by those skilled in the art without departing from the scope and spirit of the invention, the foregoing detailed description is intended to be merely exemplary and not restrictive of the invention as will now be claimed hereinbelow.

What is claimed is:

1. An A. C. protective circuit for protecting an electronic device from excessive A. C. voltages, comprising:
    a diode connected in series with the A. C. signal path to the electronic device;
    a capacitor connected in series with said signal path;
    D. C. power supply means connected to the terminals of said diode for forward biasing it, including means for blocking the passage of A. C. current;
    threshold means connected in shunt with said signal path for providing a path to charge said capacitor from the A. C. signal with a polarity for reverse biasing said diode whenever the voltage across said threshold means exceeds a predetermined level, and
    discharge means connected to the terminals of said capacitor for discharging it, including means for blocking the passage of A. C. current.

2. The A. C. protective circuit of claim 1 wherein the electronic device is a radio receiver and the A. C. signal is an R. F. signal picked up by the receiver antenna.

3. The A. C. protective circuit of claim 1 wherein said D. C. power supply means comprises a constant current source.

4. The A. C. protective circuit of claim 1 wherein said capacitor discharge is via said D. C. power supply means.

5. The A. C. protective circuit of claim 1 wherein said threshold means is a clamping device.

6. The A. C. protective circuit of claim 5 wherein said threshold means is a diode.

7. The A. C. protective circuit of claim 1 wherein the discharge period of said capacitor exceeds its charging period.

* * * * *